(12) United States Patent
Weber

(10) Patent No.: US 7,174,106 B2
(45) Date of Patent: Feb. 6, 2007

(54) MULTI-RATE AND MULTI-LEVEL GIGABIT INTERFACE CONVERTER

(75) Inventor: Andreas Weber, Redwood City, CA (US)

(73) Assignee: Finisar Corporation, Sunnyvale, CA (US)

( * ) Notice: Subject to any disclaimer, the term of this patent is extended or adjusted under 35 U.S.C. 154(b) by 995 days.

(21) Appl. No.: 09/929,737

(22) Filed: Aug. 13, 2001

(65) Prior Publication Data

US 2005/0213982 A1   Sep. 29, 2005

(51) Int. Cl.
  *H04B 10/00* (2006.01)
  *H04B 10/02* (2006.01)
(52) U.S. Cl. .................. 398/135; 398/138; 398/139; 398/164; 398/197
(58) Field of Classification Search .............. 398/73, 398/74, 135, 138, 139, 164, 166, 197; 385/88, 385/92
See application file for complete search history.

(56) References Cited

U.S. PATENT DOCUMENTS

| | | | | |
|---|---|---|---|---|
| 5,680,060 A | * | 10/1997 | Banniza et al. | 326/30 |
| 5,781,320 A | * | 7/1998 | Byers | 398/56 |
| 6,554,492 B2 | * | 4/2003 | Gilliland et al. | 385/88 |
| 6,629,638 B1 | * | 10/2003 | Sanchez | 235/454 |
| 6,862,322 B1 | * | 3/2005 | Ewen et al. | 375/316 |
| 2002/0149821 A1 | * | 10/2002 | Aronson et al. | 359/152 |
| 2003/0002108 A1 | * | 1/2003 | Ames et al. | 359/152 |

* cited by examiner

*Primary Examiner*—Dalzid Singh
(74) *Attorney, Agent, or Firm*—Workman Nydegger

(57) ABSTRACT

This disclosure is concerned with optoelectronic modules. In one example, an optoelectronic transceiver includes a data transmit line coupled to an optical source, and a data receive line coupled to an optical detector. In addition, a serial bus is provided that is distinct from both the data transmit line and the data receive line. A microprocessor is coupled to the serial bus and corresponds to a serial address. Finally, an optical driver of the optoelectronic transceiver is coupled to the optical source, and the microprocessor provides a control signal for adjusting a swing amplitude of the optical driver in accordance with one or more commands received by the microprocessor via the serial communication bus.

45 Claims, 9 Drawing Sheets

MULTI-RATE AND MULTI-LEVEL GIGABIT INTERFACE CONVERTER

FIELD OF THE INVENTION

The present invention relates generally to optoelectronic communication modules and, more specifically, to communication modules that can inter-operate with modules that transmit or receive data at various data rates.

BACKGROUND OF THE INVENTION

In 1990, a group of member companies formed the Small Form Factor (SFF) Committee as an ad hoc group to address storage industry needs. In 1992, the objectives of the SFF Committee were broadened to encompass other areas such as pinouts for interface applications and form factor issues. The SFF Committee is now a forum for resolving industry issues that are either not addressed by the standards process or need an immediate solution.

On Sep. 27, 2000, the SFF Committee published its Proposed Specification for GBIC (Gigabit Interface Converter), Rev. 5.5 (hereafter referred to as the "GBIC Specification"). The specification describes the GBIC for Fiber Channel applications applicable to systems manufacturers, system integrators, and suppliers of pluggable GBICs. The specification defines the electronic, electrical and physical interfaces of a removable serial transceiver module designed to provide gigabaud capability for Fiber Channel and other protocols that use the OSI physical layer. Notably, the specification does not imply industry consensus because in emerging product areas, there is room for more than one approach.

FIG. 1 is a block diagram of a prior art GBIC 100 as defined by the GBIC Specification. As shown in FIG. 1, GBIC 100 comprises an electrical interface 102 which is coupled to electrical circuitry 104 within GBIC 100. Electrical circuitry 104 is in turn coupled to optical subassembly 106. Optical subassembly 106 provides support circuitry to the elements that comprise optical connector 108. Among other things, optical connector comprises an optical receiver coupler 122 and optical transmitter coupler 120.

Electrical interface 102 is typically coupled to a host system while optical connector 108 is typically coupled to another transceiver module or GBIC. Electrical interface 102 comprises signals generally dedicated to transmit signals 110 and receive signals 112 for receiving and transmitting electrical signals. Moreover, electrical interface 102 comprises control signals 114 to provide control or informational signals to or from GBIC 100. Electrical interface 102 is typically an electrical connector configured to connect to a receptacle of opposite gender. Optical connector 108 is typically a fiber optic connector and can be, for example, duplex SC or FC connector for receiving and transmitting optical signals.

Prior art transceiver modules have been designed to operate within specified communication rates. Important differences among transceiver modules are the power levels of the transmit and receive signals. For example, high data rate transceiver modules typically use laser diodes to generate high intensity light output and to further accommodate fast switching speeds. Accordingly, optical detectors used to receive optical signals must be able to tolerate the high intensity light. Contrastingly, in lower data rate transceiver modules light-emitting diodes (LEDs) may be used with their slower operation and lower intensity light output. Each transceiver module can only transmit and receive data within a limited range of power levels. For example, longwave GBICs such as Finisar's' FTR-1319-3A typically receive power levels up to −3 dBm. Such a GBIC, however, does not interoperate with a low power transceiver such as an Agilent HFBR-5204 that typically receives power levels up to −14 dBm. For these and other reasons, the high data rate and low data rate prior art transceiver modules do not interoperate.

SUMMARY OF THE INVENTION

A multilevel and multirate transceiver module has been designed that can operate at multiple transmitter and receiver power ranges which are selected in accordance with an input signal. In an embodiment, the transceiver module operates at two distinct levels: (1) from −3 dBm to −9 dBm, and (2) −9 dBm to −15 dBm. In this manner, the transceiver module of the present invention interoperates with other transceiver modules such as GBICs that transmit or receive data over a power range from −3 dBm to −15 dBm. These ranges allow the transceiver module of the present invention to interoperate with modules that utilize laser 132 as well as LED based transmitters and respective receivers 131.

The multilevel and multirate transceiver module of the present invention provides further advantages by simplifying supply chain management for a transceiver module user because the transceiver module of the present invention reduces the number of different modules that must be kept in inventory.

One embodiment of the invention is an optoelectronic transceiver comprising a data transmit line, a data receive line, a serial communication bus, a microprocessor and an optical driver. The data transmit line is coupled to an optical source and the data receive line is coupled to an optical detector. Moreover, the microprocessor is coupled to the serial communication bus. In accordance with one or more commands received by the microprocessor via the serial communication bus, the microprocessor provides a control signal for adjusting a swing amplitude of the optical driver.

Another embodiment of the invention is an optoelectronic transceiver comprising a data transmit line, a data receive line, a serial communication bus, a microprocessor and an optical driver. The data transmit line is coupled to an optical source and the data receive line is coupled to an optical detector. The microprocessor is coupled to the serial communication bus. In this embodiment, the optical source is supplied with a bias current. Moreover, in accordance with one or more commands received by the microprocessor via the serial communication bus, the microprocessor provides a control signal for adjusting the bias current of the optical source.

Yet another embodiment of the invention is an optoelectronic transceiver comprising a data transmit line, a data receive line, a serial communication bus, a microprocessor and an optical driver. The data transmit line is coupled to an optical source and the data receive line is coupled to an optical detector. The microprocessor is coupled to the serial communication bus. In this embodiment, the optical detector has an electrical bandwidth. Moreover, in accordance with one or more commands received by the microprocessor via the serial communication bus, the microprocessor provides a control signal for adjusting the electrical bandwidth of the optical detector.

The serial communication bus is a two-wire bus according to another embodiment of the invention. In an embodiment, the microprocessor outputs a voltage as a control signal. This voltage can be a digital or an analog voltage. In yet another embodiment of the invention, a resistor network is provided that receives a voltage input from the microprocessor and then provides a control signal. Other embodiments of the invention provide for combining various aspects of the invention to produce an optoelectronic transceiver with the combined features.

These and other aspects of the invention will become apparent to those skilled in the art upon reading and understanding the following detailed description with reference to the accompanying figures.

BRIEF DESCRIPTION OF THE DRAWINGS

Additional objects and features of the invention will be more readily apparent from the following detailed description and appended claims when taken in conjunction with the drawings, wherein:

DESCRIPTION OF THE PREFERRED EMBODIMENTS

Figure 1:
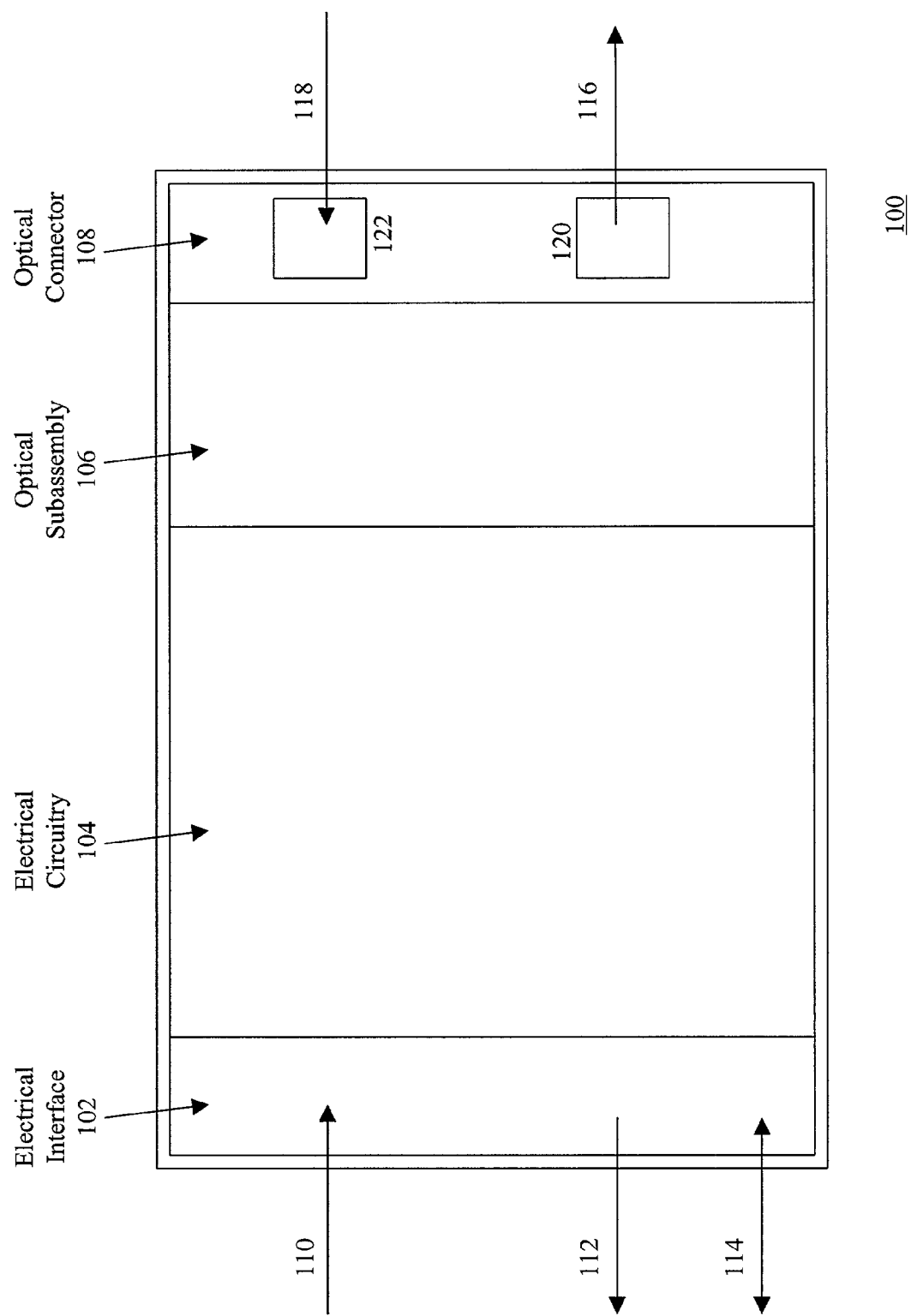
FIG. 1 is a block diagram of an optoelectronic transceiver according to the prior art.
Figure 2:
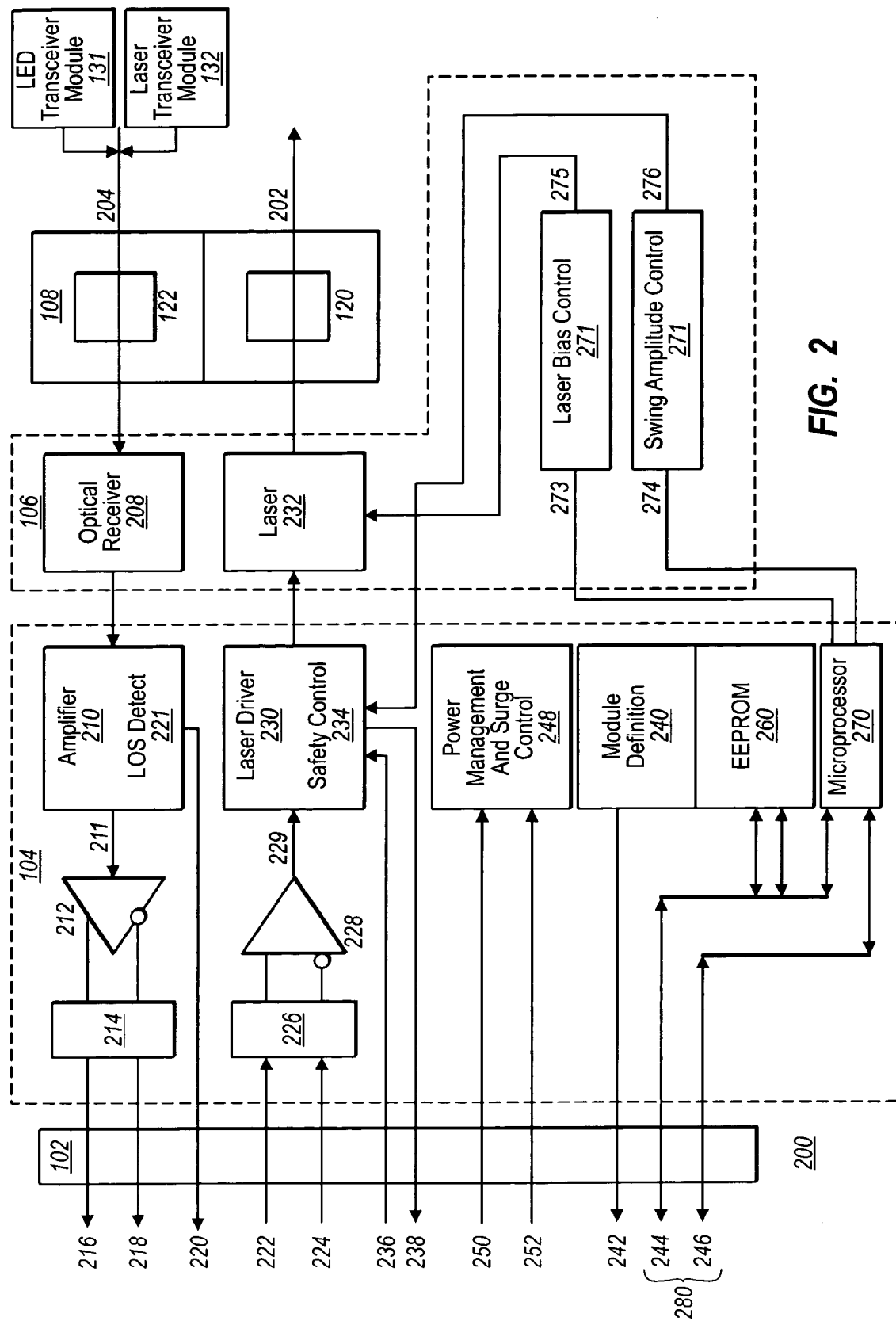
FIG. 2 is a block diagram of an optoelectronic transceiver according to an embodiment of the invention.

FIG. 2 is a block diagram of transceiver module 200 according to an embodiment of the invention. As shown in FIG. 2, duplex communication with another transceiver module or a GBIC is achieved through optical transmit signal 202 and optical receive signal 204. In receiving optical receive signal 204 from another transceiver module or GBIC, typically carried on fiber optic cable, the optical receive signal 204 is coupled to optical connector 108 which is in turn coupled to optical receiver 208. Optical receiver coupler 122 is typically an optical fiber connector. The optical signal is converted into a low level electrical signal 209 by optical receiver 208. For proper operation, however, the low level electrical signal is coupled to amplifier 210 to generate a high level electrical signal 211 which is coupled to PECL driver 212 and termination 214 to generate differential PECL signals +RX_DAT 216 and −RX_DAT 218. PECL signals +RX_DAT 216 and −RX_DAT 218 are then coupled to electrical interface 102 which is in turn coupled to an electronic host system.

Further receiver functionality is provided by detecting whether optical receive signal 204 is present or has been lost. Loss of signal detector 221 continuously monitors optical receive signal 204. Where optical receive signal 204 is lost, loss of signal detector 221 generates a RX_LOS signal 220. By means of electrical interface 102, RX_LOS signal 220 is then directed to the host system so that the host system may take action in accordance with RX_LOS signal 220.

Where a transceiver module is to transmit information to another transceiver module or GBIC, the host system generates differential PECL signals which are coupled to electrical interface 102. Differential PECL signals +TX_DAT 222 and −TX_DAT 224 are then coupled to terminator 226 and PECL receiver 228 which generates electrical transmit signal 229. Electrical transmit signal 229 is coupled to laser driver 230 which in turn provides electrical pulsing to laser 232. Laser 232 then generates an optical signal which is coupled to an optical transmitter coupler 120 in optical connector 108. Optical transmit signal 202 is then carried on fiber optic cabling to another transceiver module or GBIC.

Further transmitter functionality is provided by detecting whether any of the transmitting circuitry has failed or whether a situation has been detected such that laser 232 could be harmful. Safety control 234 continuously monitors the transmitting circuitry to verify that all conditions are satisfied for transmitting. If a problematic condition is detected, safety control 234 generates a TX_FAULT signal 238. By means of the electrical interface 102, the TX_FAULT signal 238 is then directed to the host system or computer so that the host may take action in accordance with the TX_FAULT signal 238. An action that can be taken in accordance with TX_FAULT signal 238 is to disable the transmitting circuitry including laser 232. To do so, the host system generates a transmitter disable signal which is coupled to electrical interface 102 to generate TX_DISABLE signal 236 within GBIC 100. TX_DISABLE signal 236 is then directed to safety control 234. In accordance with the TX_DISABLE signal 236, safety control 234 disables, for example, laser 232, laser driver 230 and laser bias 275. The transmitter disable signal can also be generated in other conditions such as when no fiber optic cable is connected to optical connector 108 or immediately upon powering up a GBIC 100.

The GBIC Specification defines seven (7) different module definitions. The system to which the GBIC is connected determines the module definition by the signals present on MOD_DEF(0) 242, MOD_DEF(1) 244 and MOD_DEF(2) 246 as generated by module definition block 240 and EEPROM 260. The following table shows the signal conditions denoting module definitions 1–7.

| Module Definition | MOD_DEF(0) pin 4 | MOD_DEF(1) pin 5 | MOD_DEF(2) pin 6 | Interpretation by host |
|---|---|---|---|---|
| 0 | NC | NC | NC | GBIC not present |
| 1 | NC | NC | TTL LOW | Copper Style 1 or Style 2 connector, 1.0625 Gbd, 100-TW- |

-continued

| Module Definition | MOD_DEF(0) pin 4 | MOD_DEF(1) pin 5 | MOD_DEF(2) pin 6 | Interpretation by host |
|---|---|---|---|---|
| 2 | NC | TTL LOW | NC | EL-S or 100-TP-EL-s, active inter-enclosure connection and IEEE 802.3 1000 BASE-CX Copper Style 1 or Style 2 connector, 1.0625 Gbd, 100-TW-EL-S or 100-TP-EL-s, active or passive intraenclosure connection |
| 3 | NC | TTL LOW | TTL LOW | Optical LW, 1.0625 Gbd 100-SM-LC-L |
| 4 | TTL LOW | SCL | SDA | Serial module definition protocol |
| 5 | TTL LOW | NC | TTL LOW | Optical SW, 1.0625 Gbd 100-M5-SN-I or 100-M6-SN-I |
| 6 | TTL LOW | TTL LOW | NC | Optical LW, 1.0625 Gbd 100-SM-LC-L and similar to 1.25 Gbd IEEE 802.3z 1000 BASE-LX, single mode |
| 7 | TTL LOW | TTL LOW | TTL LOW | Optical SW, 1.0625 Gbd 100-M5-SN-I or 100-M6-SN-I and 1.25 Gbd, IEEE 802.3z, 1000 BASE-SX |

In the table, TTL means transistor-transistor logic, NC means no connection, SCL means serial clock, and SDA means serial data.

With reference to module definition 4, note that MOD_DEF(0) 242 is TTL low, MOD_DEF(1) 244 is SCL and MOD_DEF(2) 246 is SDA. Through the operation of MOD_DEF(1) 244 operating as a serial clock and MOD_DEF(2) 246 operating as a bidirectional serial data line, a serial data bus 280 is created. Further referring to FIG. 2, transceiver module 200 is a module definition 4 GBIC wherein MOD_DEF(1) 244 and MOD_DEF(2) 246 collectively form serial data bus 280. For clarity in describing the present invention MOD_DEF(1) 244 and MOD_DEF(2) 246 will collectively be described as serial data bus 280. Those of skill in the art will understand how a serial clock in conjunction with a bidirectional serial data line can be configured to form a serial data bus.

As further shown in FIG. 2, serial data bus 280 is connected to EEPROM 260. EEPROM 260 is accessed by providing an appropriate address through serial data bus 280. According to the GBIC Specification, EEPROM 260 is assigned serial address #0. Through proper addressing of EEPROM 260, a GBIC having module definition 4 provides access to identification information that describes the GBIC's capabilities, standard interfaces, manufacturer, and other information. Serial data bus 280 uses a two-wire serial CMOS EEPROM protocol defined for the ATMEL AT24C01A/02/04 family of components.

EEPROM 260 is organized as a series of 8-bit data words that can be addressed individually or sequentially. Two-wire serial CMOS EEPROM 260 provides sequential or random access to eight bit parameters, addressed from 0000 h to the maximum address of the memory. A word address is transmitted with the high order bit transmitted first. The protocol for two-wire serial data bus 280 sequentially transmits one or more 8-bit bytes, with the data byte addressed by the lowest word address transmitted first. In each data byte, the high order bit is transmitted first. Numeric fields are expressed in binary, with the high order byte being transferred first and the high order bit of each byte being transferred first. Numeric fields are padded on the left with binary zero values. Character strings are ordered with the first character to be displayed located in the lowest word address of the string. Each character is coded as a US-ASCII character as defined by ISO 8859-1, with the high order bit transmitted first. All character strings are padded on the right with ASCII spaces to fill empty bytes.

Importantly, except for TX_DISABLE, the GBIC Specification does not provide control lines that allow a user to adjust the GBIC's functionality. Through the use of microprocessor 270, however, the present invention allows a user to access and control predetermined operating parameters and conditions of transceiver module 200. According to an embodiment of the invention as shown in FIG. 2, microprocessor 270 is coupled to serial data bus 280. Microprocessor 270 has a unique bus address different from bus address #0 which is used by EEPROM 260. In a preferred embodiment, microprocessor 270 is assigned bus address #7. In this manner, microprocessor 270 does not interfere with the operation of EEPROM 260. According to an aspect of the invention, serial traffic may be present on serial data bus 280, however, microprocessor 270 responds only when serial data bus 280 traffic is directed to microprocessor 270's assigned bus address, address #7 in a preferred embodiment. Microprocessor 270 is configured to read data from and write data to serial data bus 280 consistent with the operating constraints of EEPROM 260.

In a situation where a command is to be executed by microprocessor 270, a serial bus address #7 is placed on serial data bus 280. Microprocessor 270 then detects serial data bus 280 traffic directed at address #7. Accordingly, microprocessor 270 reads in an incoming command and processes the command in a command parser to perform the requested action. In another embodiment, microprocessor 270 can also send data over serial data bus 280 to provide, among other things, status information.

In an embodiment of the invention, a user inputting a signal through serial data bus 280 and addressed to microprocessor 270 can change operating parameters of transceiver module 200. In an embodiment of the invention, a user can send a command to microprocessor 270 to change an optical transmitter's output power. According to an embodiment of the invention, the output power of an optical transmitter is modified by directing an appropriately addressed command to microprocessor 270. Upon processing of the command, microprocessor 270 changes the voltages on a predetermined set of microprocessor 270 output pins. The predetermined set of microprocessor 270 output pins then provide a laser bias signal 273 to laser bias control 271. In response, laser bias control 271 changes certain predetermined operating parameters of laser 232 by means of laser bias output signal 275. The same or another set of microprocessor output pins provides swing amplitude signal 274 to swing amplitude control 272. In response to swing amplitude signal 274, swing amplitude control 272 changes certain predetermined operating parameters of laser driver 230 by means of swing amplitude output signal 276.

Figure 3:
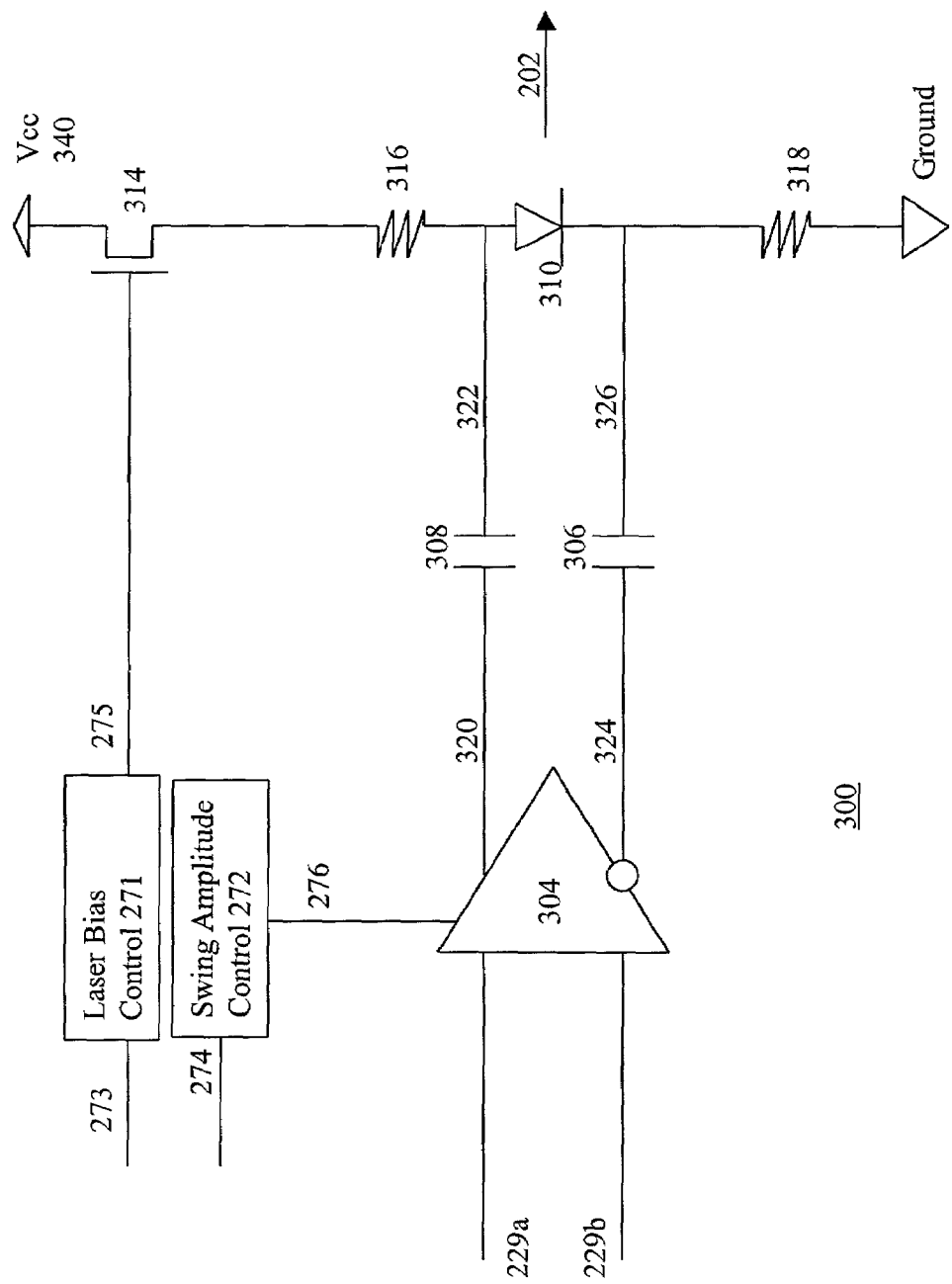
FIG. 3 is a block diagram of a laser bias control and a swing amplitude control circuit according to an embodiment of the invention.

FIG. 3 is a block diagram of a laser bias control 271 and swing amplitude control 272 according to an embodiment of the invention. As shown in FIG. 3, electrical transmit signals 229a and 229b are input to laser driver 304. Electrical transmit signals 229a and 229b correspond to electrical transmit signal 229 of FIG. 2. Referring back to FIG. 3, laser driver 304 is capacitively coupled by means of capacitors 306 and 308 to drive laser diode 310. Laser diode 310 is biased to an appropriate bias condition by applying a voltage Vcc 340 through FET 314. Resistors 316 and 318 provide a current limiting function as well as a biasing function to laser diode 310.

The present invention provides enhanced functionality over the prior art by allowing a user to select the operating condition of laser diode 310. A user may want to change the bias condition of laser diode 310 because, for example, transceiver module 200 is to be operated at increased or decreased optical power levels corresponding to transceiver modules or GBICs operating at different transmission speeds. Moreover, a user may want to change the bias condition of laser diode 310 so as to be compatible with hardware or software external to transceiver module 200. In a preferred embodiment, microprocessor 270 output pins are coupled to laser bias control 271. In an embodiment, laser bias control 271 is a resistor bias network that outputs an output voltage which then powers biasing FET 314. In this manner, laser bias control 271 can provide a plurality of distinct voltages for biasing FET 314. In turn, a plurality of biasing conditions is provided to laser diode 310.

Figure 4:
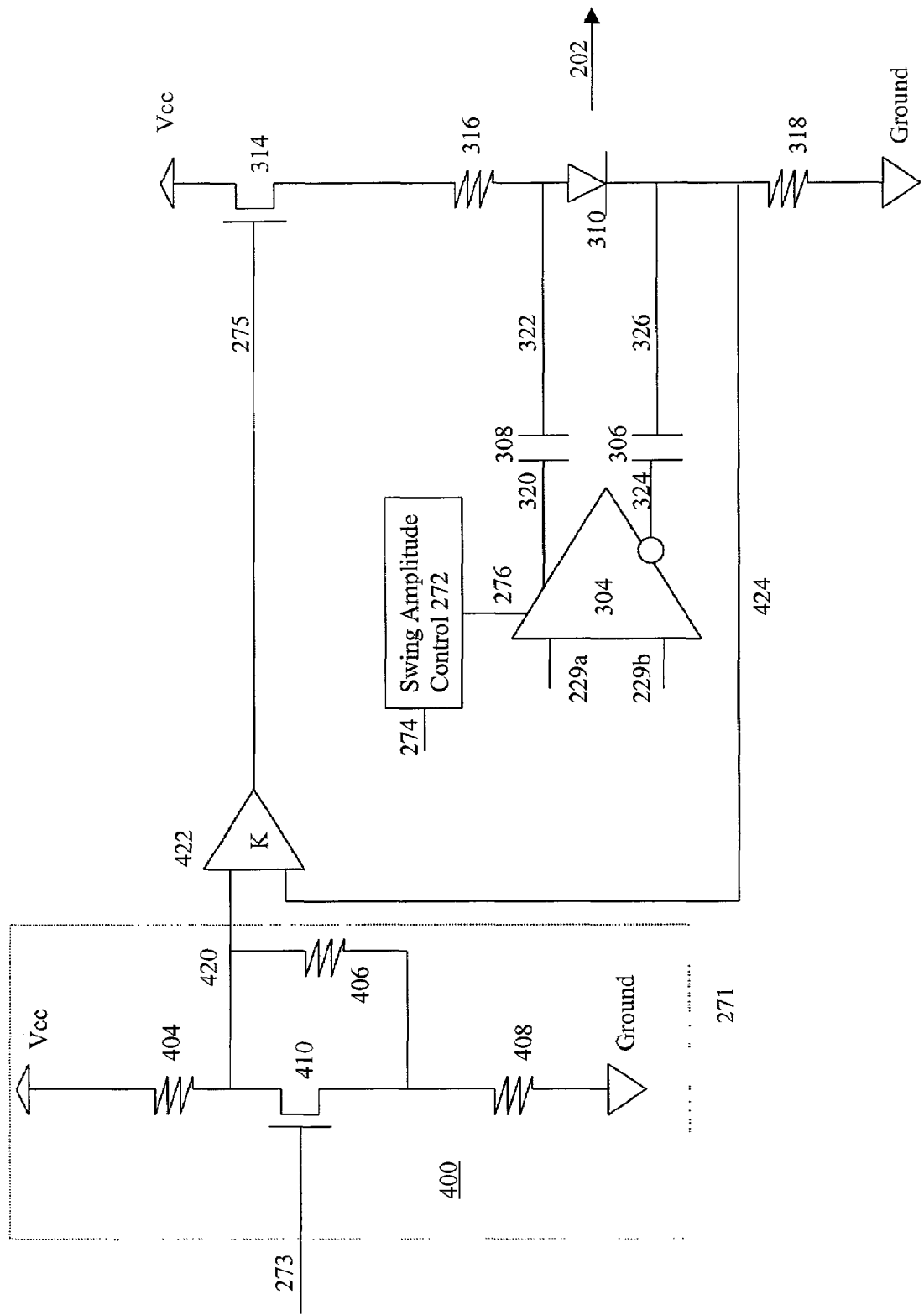
FIG. 4 is a block diagram of a resistor bias network for implementing a laser bias control according to an embodiment of the invention.

FIG. 4 shows a resistor bias network 400 configured to provide laser bias control 271 according to an embodiment of the invention. As shown in FIG. 4, microprocessor signal 273 is input to resistor bias network 400 which is directed to the gate of FET 410. The resistor bias network has two operating conditions, with FET 410 being either in an on condition or an off condition. In an on condition, FET 410 has a low drain-source resistance; and in an off condition, FET 410 has a high drain-source resistance. When FET 410 is in an off condition responsive to microprocessor signal 273, resistor bias network 400 is three series-connected resistors R1 404, R2 406 and R3 408 with output voltage 420 taken between resistor 404 and resistor 406. Output voltage 420 is the input to feedback amplifier 422. Moreover, feedback voltage 424 is also input to feedback amplifier 422. In this manner and as known in the art, the feedback loop comprising feedback amplifier 422, FET 314, laser diode 310 and resistor 318 provides a stable laser bias current by regulating FET 314 to keep output voltage 420 and feedback voltage 424 essentially equal. When FET 410 is in an on condition responsive to microprocessor signal 273, resistor bias network 400 is then two series-connected resistors R1 404 and R3 408 with output voltage 420 essentially taken between resistors R1 404 and R3 408, assuming a low drain-source resistance for FET 410. In an on condition for FET 410, resistor R2 406 is essentially bypassed. In such a condition, the feedback loop regulates FET 314 to keep output voltage 420 and feedback voltage 424 essentially equal. In this second condition, a different voltage is present at output voltage 420 with the feedback generating an essentially equal feedback voltage 424 to provide a different operating condition for laser diode 310.

In another embodiment of the invention, laser bias control 271 is digital and analog circuitry that converts digital outputs of microprocessor 270 into analog voltages. In yet another embodiment, laser bias control 271 comprises a digital-to-analog converter that converts digital outputs of microprocessor 270 into analog voltages. One of skill in the art will appreciate that modifications to the embodiments described here are possible without deviating from the teachings of the invention.

Referring to FIG. 3, microprocessor 270 output pins are also coupled to swing amplitude control 272. In practice, changes to the bias condition of a laser diode 310 further necessitate a change in the output swing of laser driver 304. For example, high and low output power operating conditions require different biasing and swing amplitude conditions. In an embodiment, swing amplitude control 272 is a resistor bias network that outputs an output voltage which then changes the output swing of laser driver 304. Swing amplitude control 272 can provide a plurality of distinct output signals to laser driver 304. In turn, a plurality of distinct output swing conditions is provided for laser driver 422.

Figure 5:
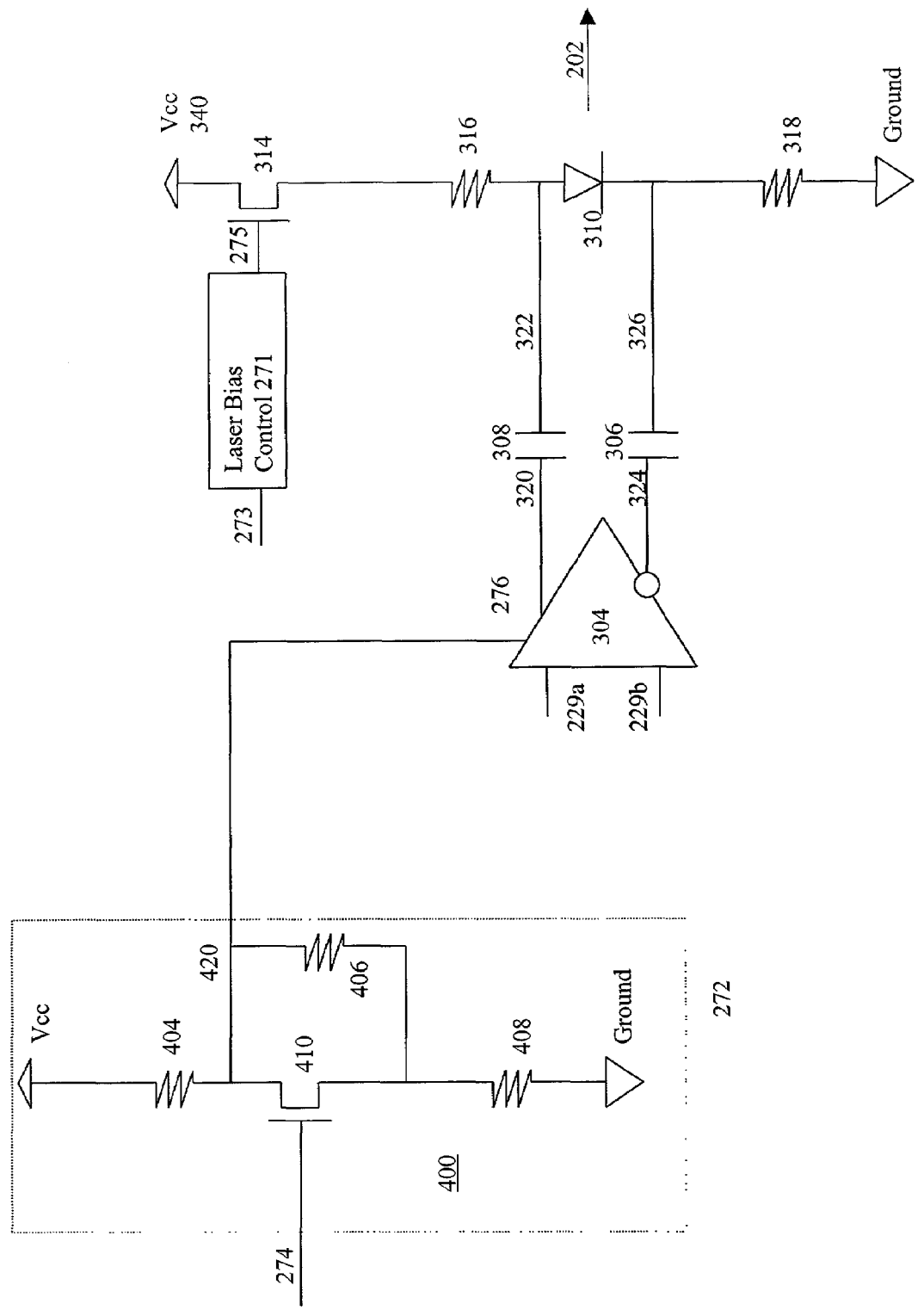
FIG. 5 is a block diagram of a resistor bias network for implementing a swing amplitude control according to an embodiment of the invention.

Modifications to resistor bias network 400 of FIG. 4 can be made to adapt it for use as swing amplitude control 272 as shown in FIG. 5. Resistor bias network 400 is essentially the same as was shown in FIG. 4, however, one of skill in the art will understand that changes in the resistors R1 404, R2 406 and R3 408 and FET 410 as well as the possible removal of feedback amplifier 422 may be necessary to adapt resistor bias network 400 for use as swing amplitude control 272.

Figure 6:
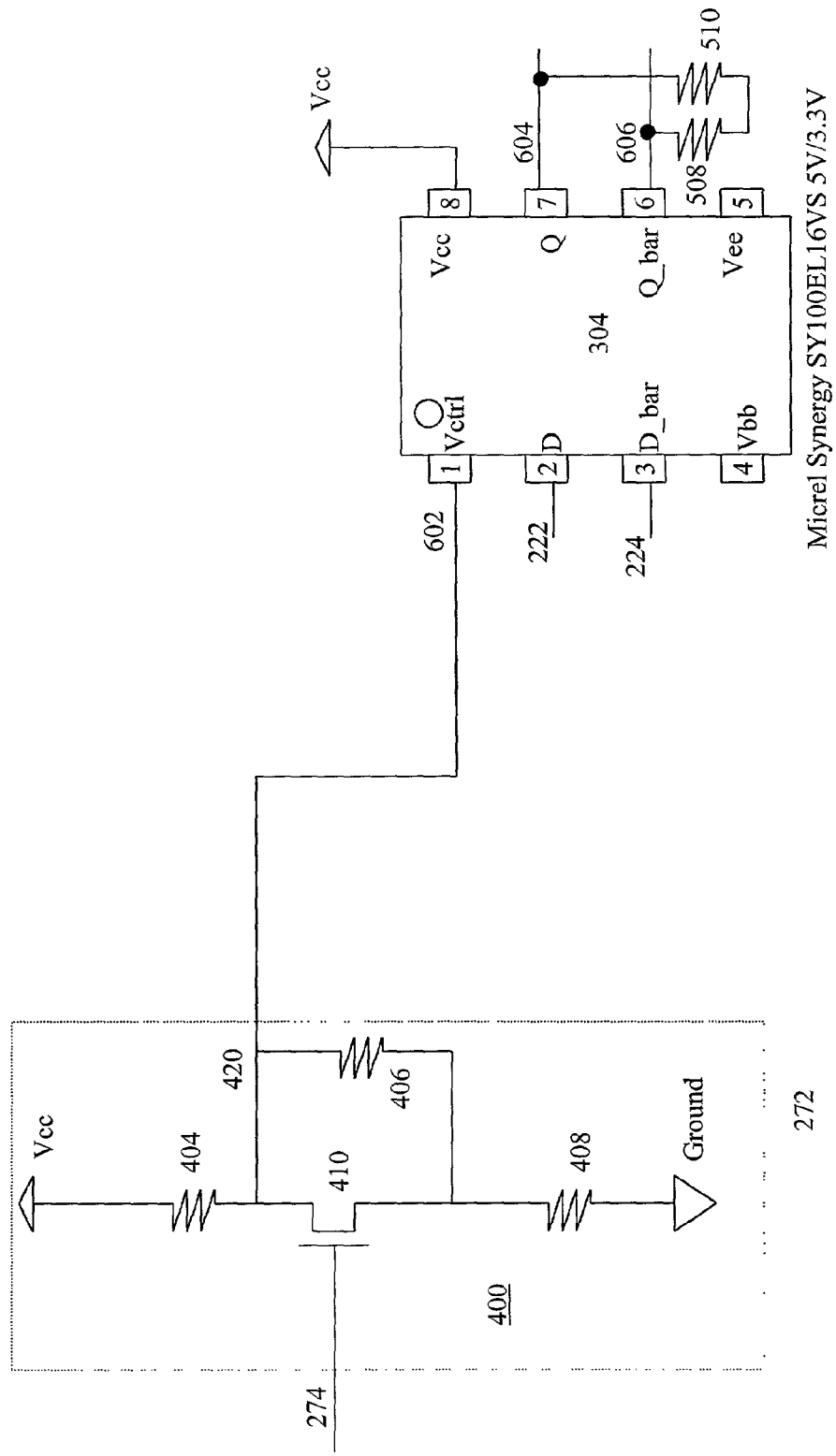
FIG. 6 is a block diagram of a laser driver swing amplitude control circuit according to an embodiment of the invention.

In a preferred embodiment, laser driver 304 is a Micrel Synergy SY100EL16VS 5V/3.3V variable output swing differential receiver. Laser driver 304 of FIG. 6 is the SY100EL16VS product which has an output swing control input 602 to provide a variable output swing at differential output Q 604 and Q_bar 606. As shown in FIG. 6, resistor bias network 400 is coupled to output swing control 602. Resistor bias network 400 operates as previously described, however, one of skill in the art will understand that resistors 404, 406 and 408 as well as feedback amplifier 422 and FET 410 will not necessarily be the same when implementing resistor bias network 400 for use as swing amplitude control 272. A proper output swing is assured by coupling differential output Q 604 and Q_bar 606 with resistors 508 and 510. In an embodiment, differential output Q 604 and Q_bar 606 of FIG. 6 corresponds to differential output Q 320 and Q_bar 324 of FIG. 3.

In another embodiment of the invention, swing amplitude control 272 is digital and analog circuitry that converts digital outputs of microprocessor 270 into analog voltages. In yet another embodiment, swing amplitude control 272 comprises a digital-to-analog converter that converts digital outputs of microprocessor 270 into analog voltages. One of skill in the art will appreciate that modifications to the embodiments described here are possible without deviating from the teachings of the invention.

The present invention provides a microprocessor 270 whose functionality is not limited to controlling certain operating parameters of laser 232. In fact, the present invention provides microprocessor 270 to control electrical bandwidth of optical receiver 208. Other embodiments of the present invention control operating parameters of amplifier 210, LOS detector 221, laser driver 230, safety control 234, optical receiver 228, optical transmitter 212 and power & surge control 248. One of skill in the art will understand that additional embodiments may be implemented, consistent with the teachings of the present invention.

In an embodiment of the invention, transceiver module 200 is configured to interoperate with other transceiver modules including GBIC modules that can transmit and receive data at rates ranging from 16 Mb/s to 1.25 Gb/s. In such an embodiment, optical power levels are approximately between −3 dBm to −15 dBm. In this embodiment, transceiver module 200 can interoperate with modules having laser 132 as well as LED transmitters and respective receivers 131. As described above, laser bias control and swing amplitude control must be provided. Furthermore, the electrical bandwidth of the optical receiver must be changed for the different operating conditions to provide maximum sensitivity.

Figure 7:
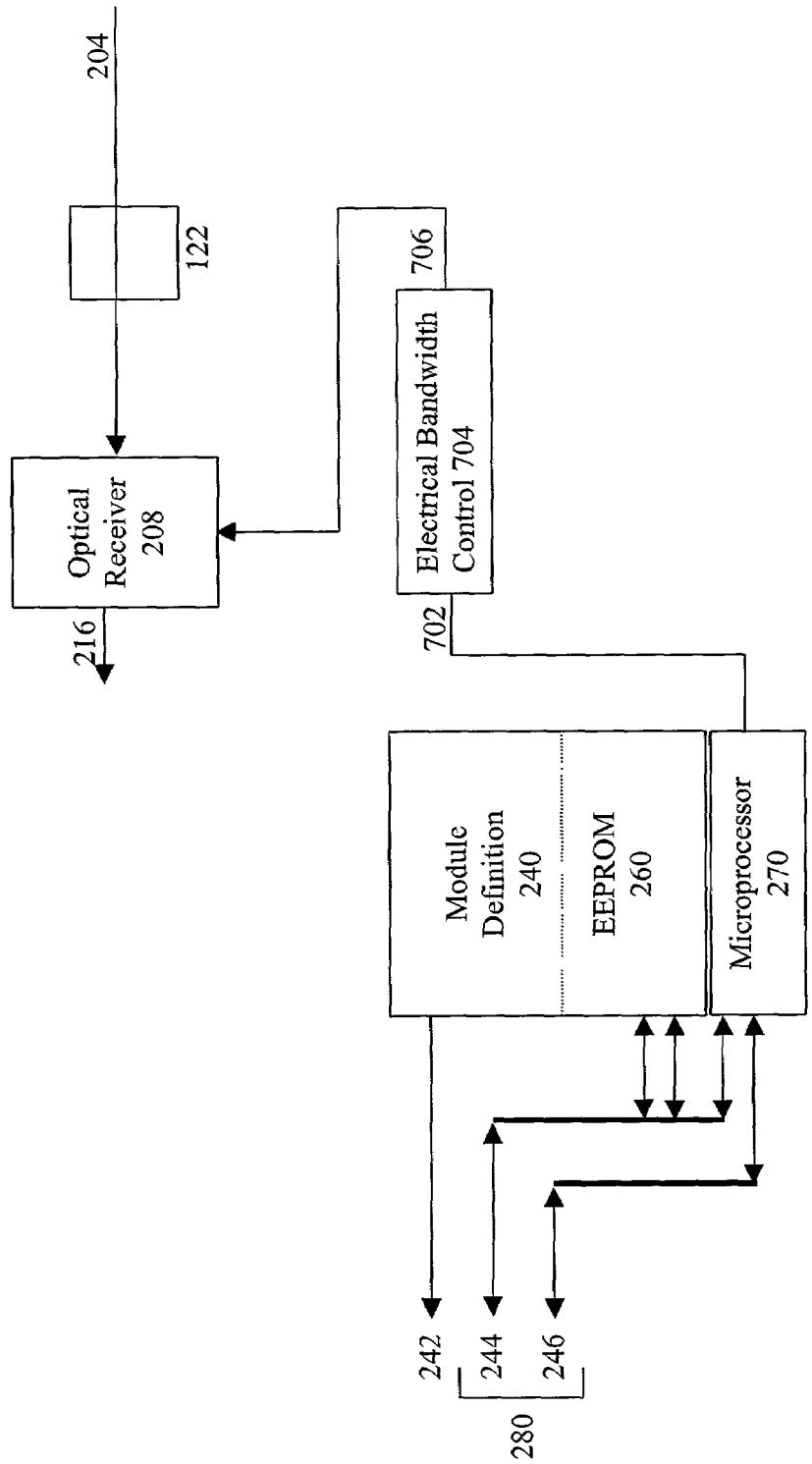
FIG. 7 is a block diagram of an electrical bandwidth control circuit according to an embodiment of the invention.

As shown in FIG. 7, microprocessor 270 is coupled through electrical bandwidth control input 702 to electrical bandwidth control 704 according to an embodiment of the invention. Electrical bandwidth control 704 then directs optical receiver control signal 706 to optical receiver 208. In a preferred embodiment, electrical bandwidth control 704 can be, but need not be, similar to laser bias control 271 and swing amplitude control 272 as described for FIGS. 2–6. Moreover, electrical bandwidth control can be, but need not be, implemented similarly to resistor bias network 400 as described for FIGS. 4–6. In an embodiment of the invention, electrical bandwidth control 704 can provide a plurality of output signals to optical receiver 208 and amplifier 210 to adjust, among other things, the gain of amplifier 210. Accordingly, optical receiver 208 and amplifier 210 have a plurality of operating modes. In another embodiment of the invention, electrical bandwidth control 704 is digital and analog circuitry that converts digital outputs of microprocessor 270 into analog voltages. In yet another embodiment, electrical bandwidth control 704 comprises a digital-to-analog converter that converts digital outputs of microprocessor 270 into analog voltages. One of skill in the art will appreciate that modifications to the embodiments described here are possible without deviating from the teachings of the invention.

Figure 8:
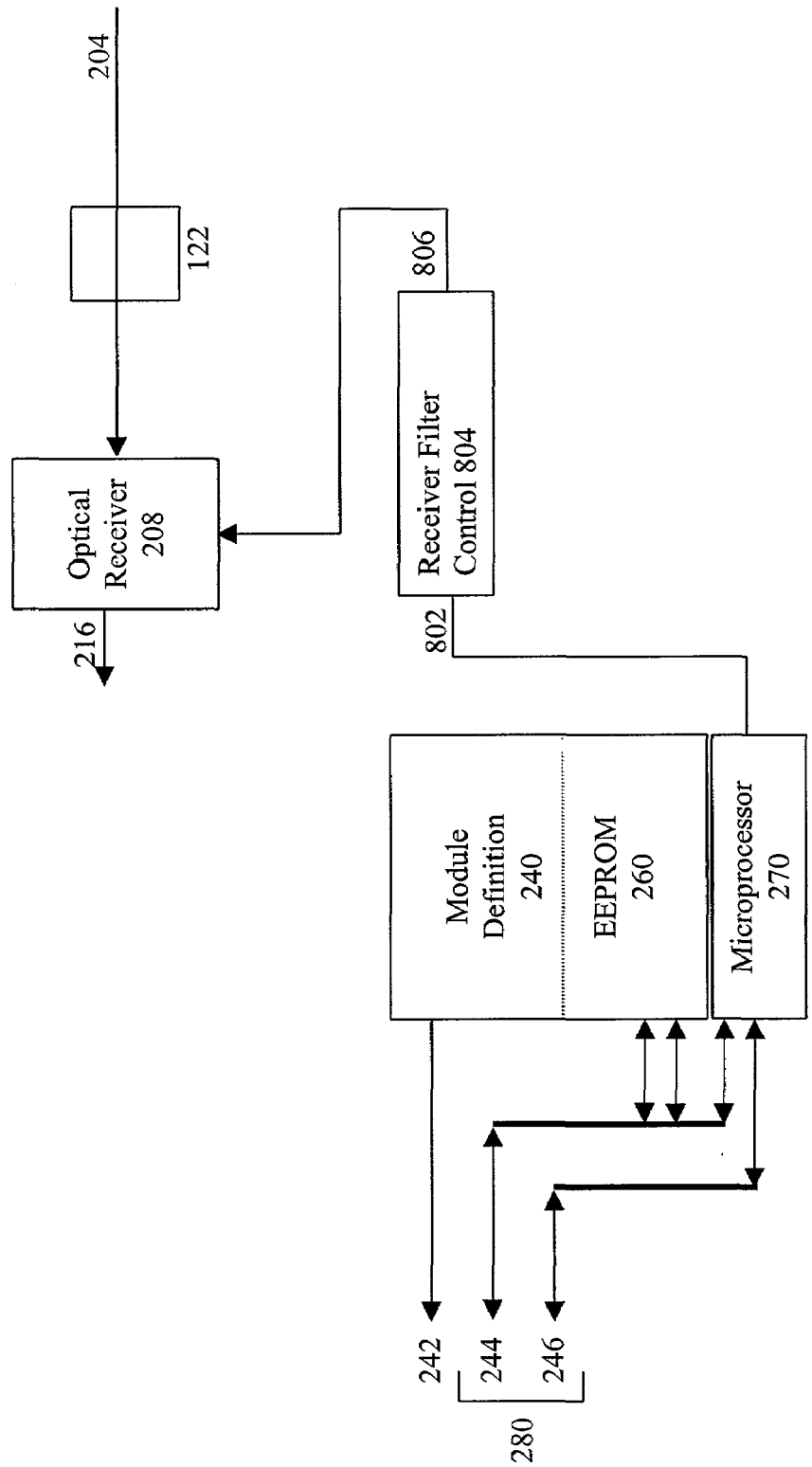
FIG. 8 is a block diagram of a receiver filter control according to an embodiment of the invention.

In a preferred embodiment operating at transmit and receive data rates between 16 Mb/s and 1.25 Gb/s and optical power levels approximately between −3 dBm to −15 dBm, it is necessary to control the electrical bandwidth of the receiver in order to maximize its sensitivity. Moreover, it may become necessary to provide filtering to optical receiver 208 to remove noise and other unwanted signals. Accordingly, an embodiment of the invention as shown in FIG. 8 provides for microprocessor 270 to be coupled to receiver control 804. Receiver control 804 provides receiver control signal 806 to adjust the operating parameters of optical receiver 208. Although not shown, receiver control signal 806 can be provided to other components of transceiver module 200 to adjust its operating conditions.

Figure 9:
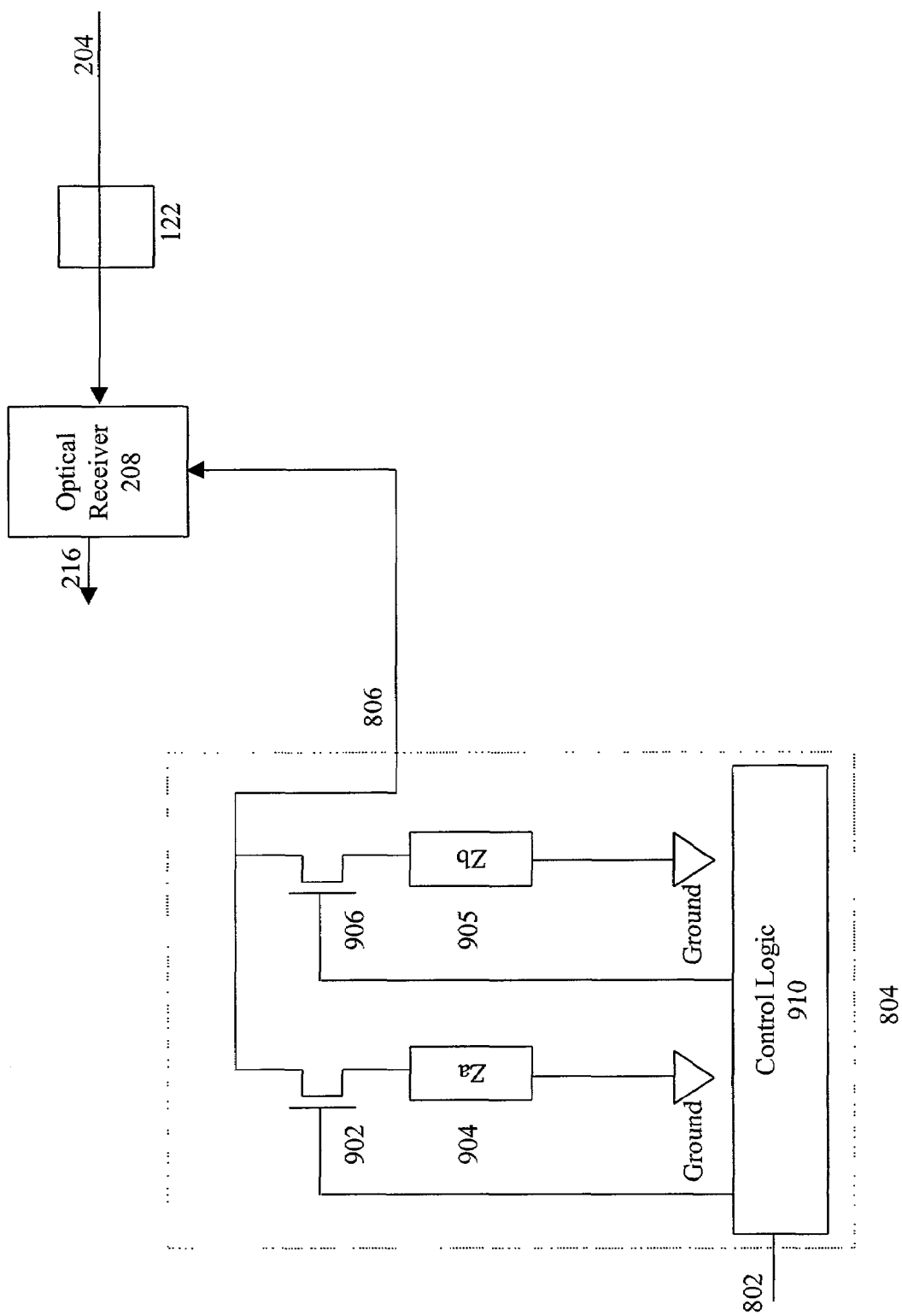
FIG. 9 is a block diagram of a receiver filter control circuit implemented using control logic and a plurality of filters according to an embodiment of the invention.

FIG. 9 shows an embodiment of receiver filter control 804 applied to optical receiver 208. As shown in FIG. 9, receiver filtering input signal 802, which is produced by microprocessor 270, is input to control logic 910. Control logic 910 then activates a plurality of FETs 902 and 906 to couple filters 904 and 905 to receiver filter control signal 806. In operation, control logic 910 selects from a plurality of filters to couple selected filters to optical receiver 208. As shown in FIG. 8, a user can input a signal to serial data bus 280 which is parsed by microprocessor 270 to select, for example, filter 904 of FIG. 9 with characteristic impedance Za. In order to do so, control logic 910 provides signals to FET 902 to turn it on, thus having low drain-source resistances. Simultaneously, control logic 910 provides signals to FET 906 to turn it off, thus having high drain-source resistances. In this manner, filter 904 having impedance Za is coupled to the receiver while filter 905 is de-coupled.

One of skill in the art will understand that more than two filters can be coupled to control logic 910. Furthermore, one of skill in the art will understand that receiver filter control 804 can be applied to other aspects of transceiver module 200 including the amplifier 210, PECL driver 212, PECL receiver 228 and laser driver 230.

The present invention provides for the control of many operating parameters of transceiver module 200 by providing a serial data bus 280 for communicating with a microprocessor 270. Microprocessor 270 is then configured to control a specific operating parameter of transceiver module 200 as required by the user. As this invention may be embodied in several forms without departing from the spirit of essential characteristics, the present embodiments are therefore illustrative and not restrictive. The scope of the invention is defined by the appended claims rather than by the description preceding them. All changes that fall within the meets and bounds of the claims, or equivalence of such meets and bounds are therefore intended to be embraced by the claims.

What is claimed is:

1. An optoelectronic transceiver comprising:
   a data transmit line coupled to an optical source;
   a data receive line coupled to an optical detector, where the optical detector has first and second operating modes such that in the first operating mode, the optical detector is configured to operate in connection with LED-generated optical signals, and in the second operating mode, the optical detector is configured to operate in connection with laser-generated optical signals;
   a serial communication bus distinct from the data transmit line and data receive line;
   a microprocessor coupled to the serial communication bus, the microprocessor corresponding to a serial address; and
   an optical driver coupled to the optical source, the microprocessor providing a control signal for adjusting a swing amplitude of the optical driver in accordance with one or more commands received by the microprocessor via the serial communication bus.

2. The optoelectronic transceiver of claim 1, wherein the optical source is supplied with a bias current, the microprocessor providing a control signal for adjusting the bias current of the optical source in accordance with the one or more commands received by the microprocessor via the serial communication bus.

3. The optoelectronic transceiver of claim 2, wherein the optical detector has an electrical bandwidth, the microprocessor providing a control signal for adjusting the electrical bandwidth of the optical detector in accordance with one or more commands received by the microprocessor via the serial communication bus.

4. The optoelectronic transceiver of claim 3, wherein the optical detector has an electrical bandwidth, and further comprising:
a plurality of filtering components, the microprocessor providing control signals to the filtering components for coupling to the optical detector in accordance with one or more commands received by the microprocessor via the serial communication bus.

5. The optoelectronic transceiver of claim 2, wherein the optical detector has an electrical bandwidth, and further comprising:
a plurality of filter components, the microprocessor providing control signals to the filter components for coupling to the optical detector in accordance with one or more commands received by the microprocessor via the serial communication bus.

6. The optoelectronic transceiver of claim 1, wherein the optical detector has an electrical bandwidth, the microprocessor providing a control signal for adjusting the electrical bandwidth of the optical detector in accordance with one or more commands received by the microprocessor via the serial communication bus.

7. The optoelectronic transceiver of claim 6, wherein the optical detector has an electrical bandwidth, and further comprising:
a plurality of filter components, the microprocessor providing control signals to the filter components for coupling to the optical detector in accordance with one or more commands received by the microprocessor via the serial communication bus.

8. The optoelectronic transceiver of claim 1, wherein the optical detector has an electrical bandwidth, and further comprising:
a plurality of filter components, the microprocessor providing control signals to the filter components for coupling to the optical detector in accordance with one or more commands received by the microprocessor via the serial communication bus.

9. The optoelectronic transceiver of claim 1, wherein the serial communication bus is a two-wire bus.

10. The optoelectronic transceiver of claim 1, wherein the control signal is an output voltage from the microprocessor.

11. The optoelectronic transceiver of claim 1, wherein the control signal is a voltage from a resistor network wherein the resistor network receives an output voltage from the microprocessor.

12. The optoelectronic transceiver of claim 11, wherein the resistor network includes a transistor.

13. The optoelectronic transceiver of claim 1, wherein the optical source is a laser diode.

14. The optoelectronic transceiver of claim 1, wherein the optical driver is an integrated circuit.

15. An optoelectronic transceiver comprising:
a data transmit line coupled to an optical source;
a data receive line coupled to an optical detector, where the optical detector has first and second operating modes such that in the first operating mode, the optical detector is configured to operate in connection with LED-generated optical signals, and in the second operating mode, the optical detector is configured to operate in connection with laser-generated optical signals;
a serial communication bus distinct from the data transmit line and data receive line; and
a microprocessor coupled to the serial communication bus, the microprocessor corresponding to a serial address;
the optical source supplied with a bias current, the microprocessor providing a control signal for adjusting the bias current of the optical source in accordance with one or more commands received by the microprocessor via the serial communication bus.

16. The optoelectronic transceiver of claim 15, wherein the optical detector has an electrical bandwidth, the microprocessor providing a control signal for adjusting the electrical bandwidth of the optical detector in accordance with one or more commands received by the microprocessor via the serial communication bus.

17. The optoelectronic transceiver of claim 16, wherein the optical detector has an electrical bandwidth, and further comprising:
a plurality of filter components, the microprocessor providing control signals to the filter components for coupling to the optical detector in accordance with one or more commands received by the microprocessor via the serial communication bus.

18. The optoelectronic transceiver of claim 15, wherein the optical detector has an electrical bandwidth, and further comprising:
a plurality of filter components, the microprocessor providing control signals to the filter components for coupling to the optical detector in accordance with one or more commands received by the microprocessor via the serial communication bus.

19. The optoelectronic transceiver of claim 15, wherein the serial communication bus is a two-wire bus.

20. The optoelectronic transceiver of claim 15, wherein the control signal is an output voltage from the microprocessor.

21. The optoelectronic transceiver of claim 15, wherein the control signal is a voltage from a resistor network wherein the resistor network receives an output voltage from the microprocessor.

22. The optoelectronic transceiver of claim 21, wherein the resistor network includes a transistor.

23. The optoelectronic transceiver of claim 15, wherein the optical source is a laser diode.

24. The optoelectronic transceiver of claim 15, wherein the optical driver is an integrated circuit.

25. An optoelectronic transceiver comprising:
a data transmit line coupled to an optical source;
a data receive line coupled to an optical detector;
a serial communication bus distinct from the data transmit line and data receive line; and
a microprocessor coupled to the serial communication bus, the microprocessor corresponding to a serial address;
the optical detector has an electrical bandwidth, the microprocessor providing a control signal for adjusting the electrical bandwidth of the optical detector in accordance with one or more commands received by the microprocessor via the serial communication bus, the optoelectronic transceiver capable of interoperating with a first other transceiver utilizing laser based transmitters and respective receivers and the optoelectronic transceiver also capable of interoperating with a second other transceiver utilizing LED based transmitters and respective receivers.

26. The optoelectronic transceiver of claim 25, wherein the optical detector has an electrical bandwidth, and further comprising:
a plurality of filter components, the microprocessor providing control signals to the filter components for coupling to the optical detector in accordance with one or more commands received by the microprocessor via the serial communication bus.

27. The optoelectronic transceiver of claim 25, wherein the serial communication bus is a two-wire bus.

28. The optoelectronic transceiver of claim 25, wherein the control signal is an output voltage from the microprocessor.

29. The optoelectronic transceiver of claim 25, wherein the control signal is a voltage from a resistor network wherein the resistor network receives an output voltage from the microprocessor.

30. The optoelectronic transceiver of claim 29, wherein the resistor network includes a transistor.

31. The optoelectronic transceiver of claim 25, wherein the optical detector is a pin diode or Avalanche Photo Diode (APD).

32. The optoelectronic transceiver of claim 25, wherein the optoelectronic transceiver further comprises a transistor by way of which a bias current is supplied to the optical source.

33. The optoelectronic transceiver of claim 32, wherein the transistor receives the control signal.

34. An optoelectronic transceiver comprising:
a data transmit line coupled to an optical source;
a data receive line coupled to an optical detector;
a serial communication bus distinct from the data transmit line and data receive line;
a microprocessor coupled to the serial communication bus, the microprocessor corresponding to a serial address;
the optical detector has an electrical bandwidth,
and a plurality of filter components, the microprocessor providing control signals to the filter components for coupling to the optical detector in accordance with one or more commands received by the microprocessor via the serial communication bus, the optoelectronic transceiver capable of interoperating with a first other transceiver utilizing laser based transmitters and respective receivers and the optoelectronic transceiver also capable of interoperating with a second other transceiver utilizing LED based transmitters and respective receivers.

35. The optoelectronic transceiver of claim 34, wherein the serial communication bus is a two-wire bus.

36. The optoelectronic transceiver of claim 34, wherein the control signal is an output voltage from the microprocessor.

37. The optoelectronic transceiver of claim 34, wherein the control signal is a voltage from a resistor network wherein the resistor network receives an output voltage from the microprocessor.

38. The optoelectronic transceiver of claim 37, wherein the resistor network includes a transistor.

39. The optoelectronic transceiver of claim 34, wherein the plurality of filter components includes resistive and capacitive devices.

40. The optoelectronic transceiver of claim 34, wherein the plurality of filter components includes transistors.

41. The optoelectronic transceiver of claim 40, wherein the transistors are field effect transistors.

42. The optoelectronic transceiver of claim 34, wherein the optoelectronic transceiver is compatible for communication with transceivers that employ an LED as an optical emitter, and with transceivers that employ a laser as an optical emitter.

43. An optoelectronic transceiver comprising:
a data transmit line coupled to an optical source;
a data receive line coupled to an optical detector;
a serial communication bus distinct from the data transmit line and data receive line; and
a microprocessor coupled to the serial communication bus, the microprocessor corresponding to a serial address;
the optoelectronic transceiver capable of interoperating with a first other transceiver utilizing laser based transmitters and respective receivers and the optoelectronic transceiver also capable of interoperating with a second other transceiver utilizing LED based transmitters and respective receivers.

44. The optoelectronic transceiver of claim 43, wherein the optoelectronic transceiver can transmit and receive data at rates ranging from 16 Mb/s to 1.25 Gb/s.

45. The optoelectronic transceiver of claim 43, wherein the optoelectronic transceiver is compatible with signals having optical power levels in a range from about −3 dBm to about −15 dBm.

* * * * *